A. COPONY.
AUTOMOBILE DECKING DEVICE.
APPLICATION FILED MAR. 1, 1920.

1,433,261.

Patented Oct. 24, 1922.
4 SHEETS—SHEET 1.

Inventor
Alfred Copony

By
Whittemore, Hulbert & Whittemore
Attorneys

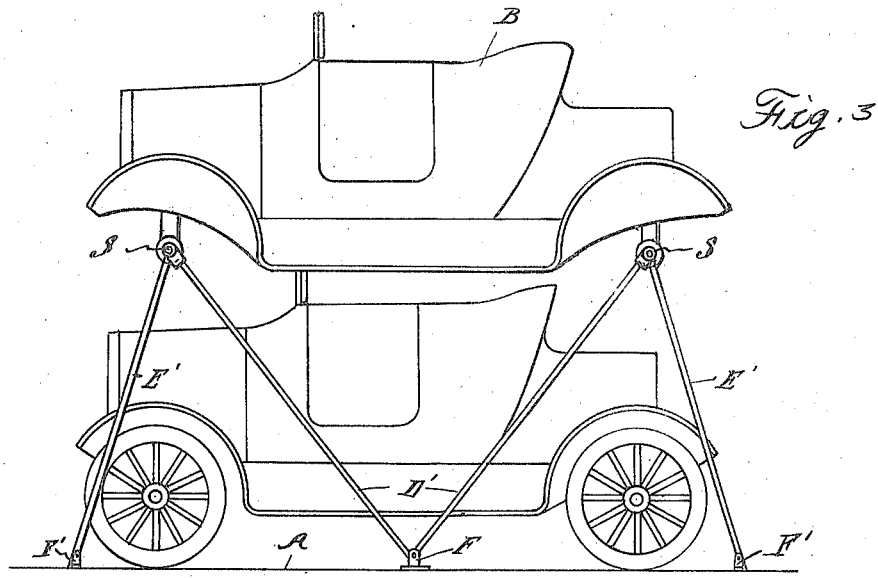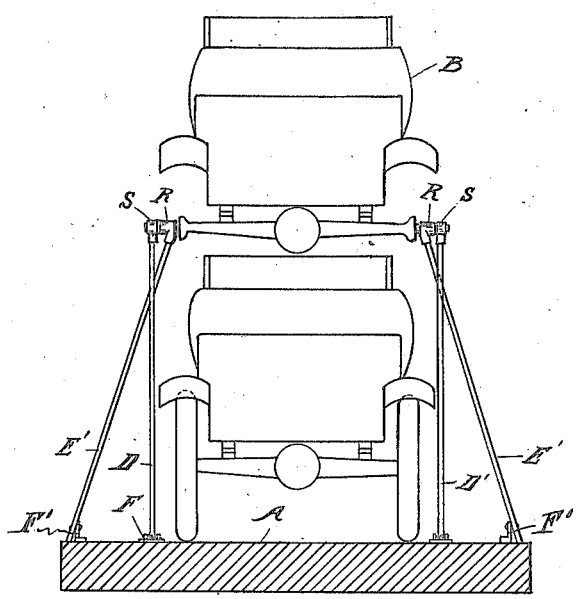

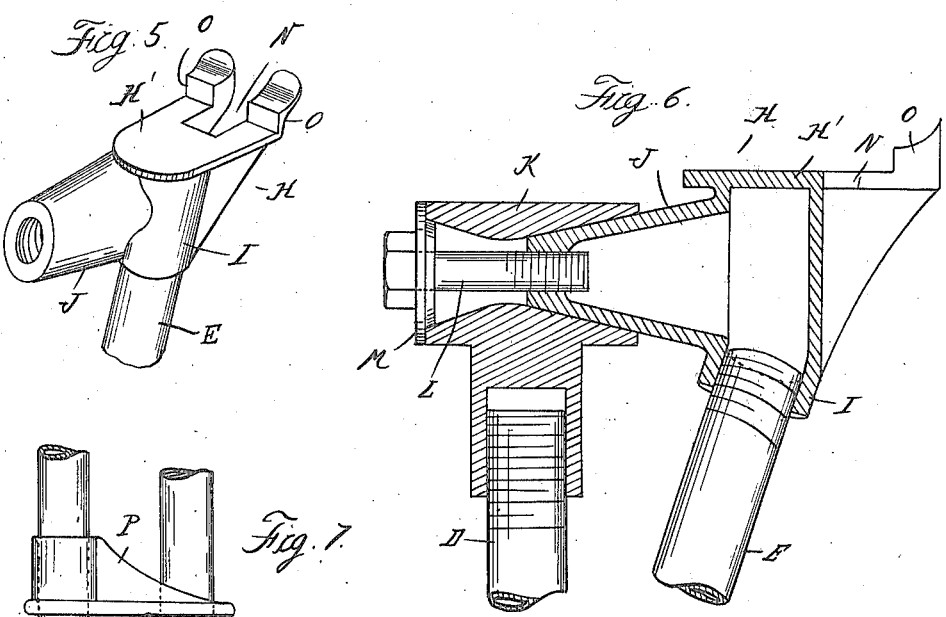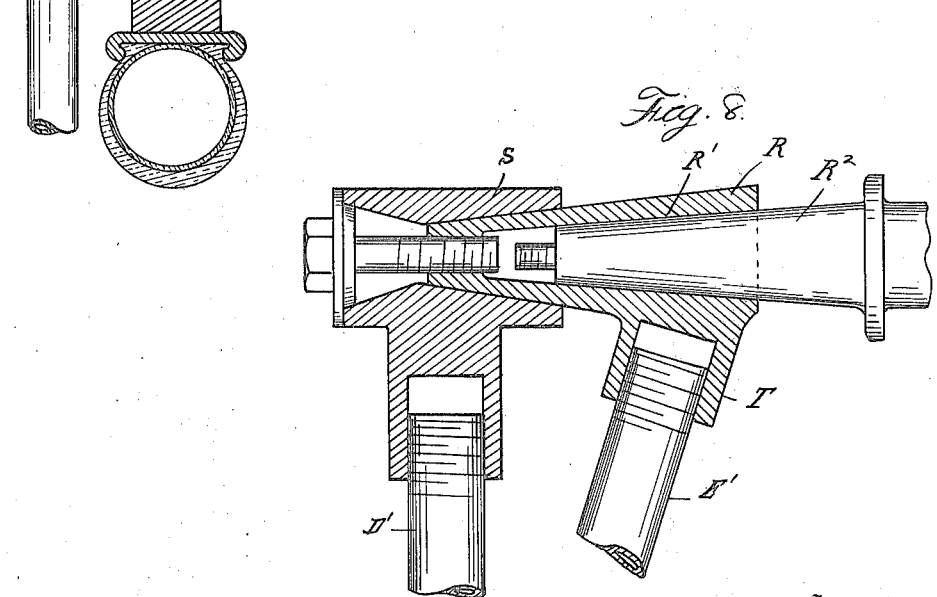

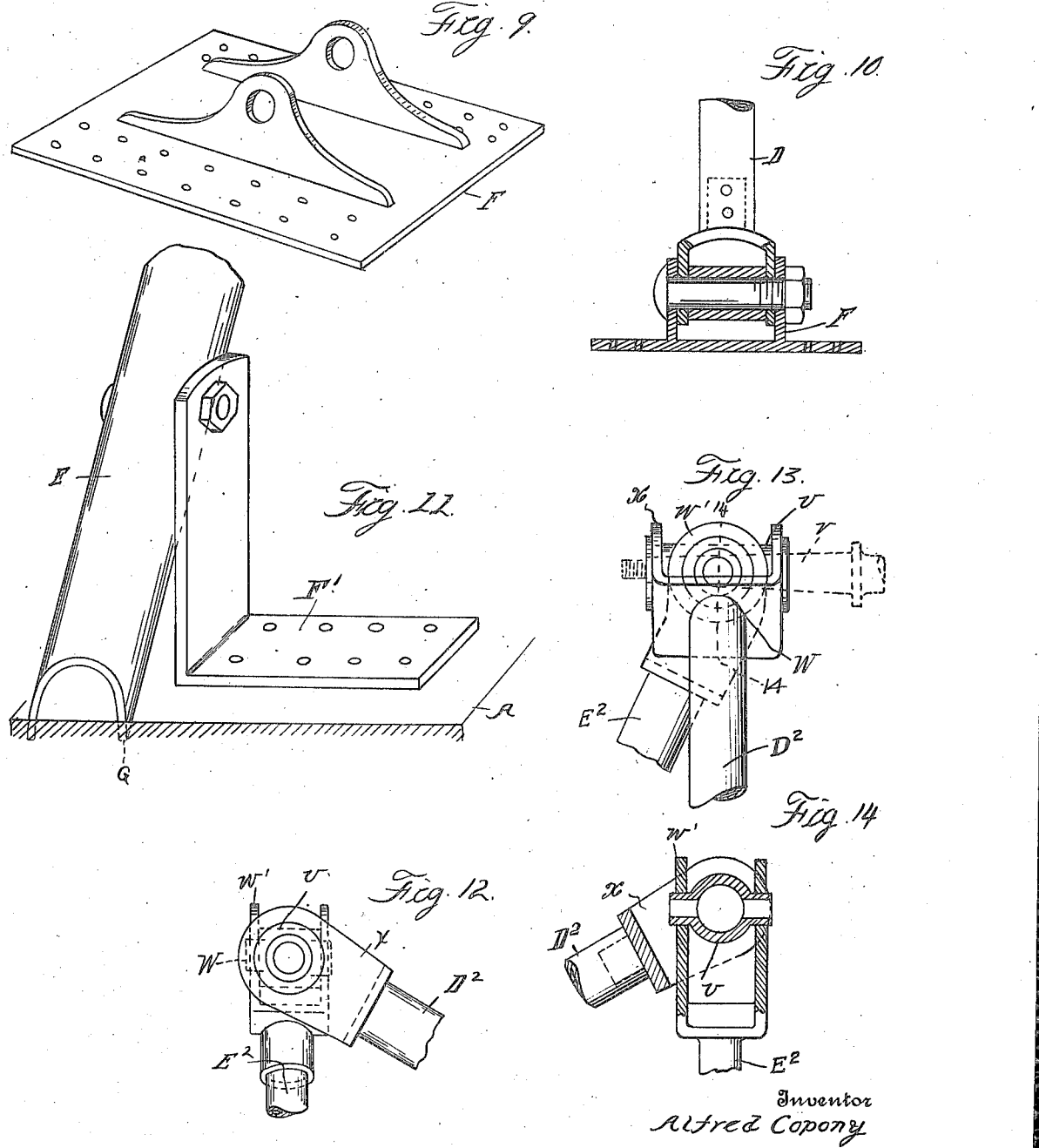

Patented Oct. 24, 1922.

1,433,261

UNITED STATES PATENT OFFICE.

ALFRED COPONY, OF DETROIT, MICHIGAN, ASSIGNOR TO COPONY AUTO LOADING COMPANY, OF DETROIT, MICHIGAN, A CORPORATION OF MICHIGAN.

AUTOMOBILE DECKING DEVICE.

Application filed March 1, 1920. Serial No. 362,448.

*To all whom it may concern:*

Be it known that I, ALFRED COPONY, a citizen of Austria, residing at Detroit, in the county of Wayne and State of Michigan, have invented certain new and useful Improvements in Automobile Decking Devices, of which the following is a specification, reference being had therein to the accompanying drawings.

This invention relates to automobile decking devices, such as are employed to mount an automobile at an elevation upon a freight car or other conveyance, so as to permit the loading of another automobile in the underlying space.

It is the object of the invention to provide a frame for supporting an automobile or other vehicle at an elevation, said frame comprising a simple arrangement of brace bars so inclined as to adequately resist stresses acting either longitudinally or transversely of the supported vehicle.

It is also the object to provide for thus supporting a vehicle either with or without its wheels.

The invention consists in the structural features and arrangement of parts hereinafter fully described and illustrated in the accompanying drawings: wherein—

Figure 3 is a view similar to Figure 1, but showing the invention somewhat modified to support an automobile with the wheels thereof removed;

Figure 4 is an end view of the same;

Figure 5 is a perspective detail view of a fitting for connecting the upper ends of two of the frame members of the decking device and for providing a seat to be engaged by the felly of one of the vehicle wheels;

Figure 6 is a sectional view showing said fitting and the connection between the same and the two said frame members;

Figure 7 is a detail view of a bracket arm mounted upon one of the brace members of the frame for engagement with the felly;

Figure 8 is a view similar to Figure 6, but disclosing a fitting for engagement with an axle spindle rather than with a wheel felly, which fitting is employed with that form of the invention illustrated in Figures 3 and 4;

Figure 9 is a detail perspective view of a bracket adapted to provide a common anchorage for two of the brace members of the frame and secured to the platform of the car;

Figure 10 is a transverse sectional view of the same;

Figure 11 is a perspective view showing a bracket member associated with another of the brace members;

Figure 12 is a side view of a modified form of fitting which may engage the axle spindle when the wheels of the supported vehicle are removed;

Figure 13 is an end view of the same;

Fig. 14 is a section on line 14—14 of Fig. 13.

Figure 1:
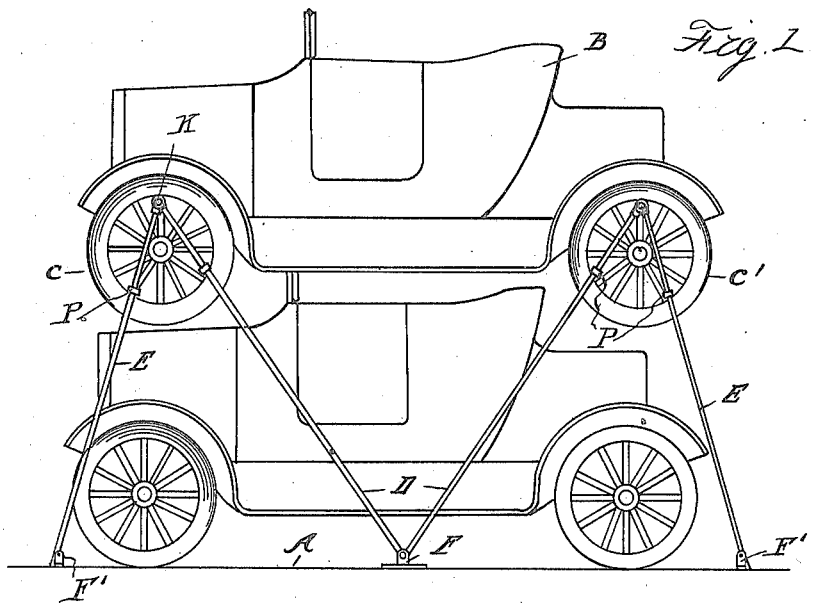
Figure 1 is a view in side elevation showing an automobile supported by the improved decking device.
Figure 2:
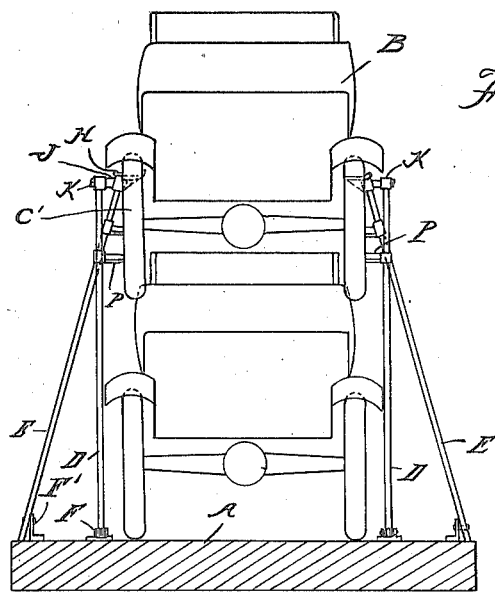
Figure 2 is an end view of the same, indicating the underlying motor vehicle.

In these views the reference character A designates the platform of a freight car and B an automobile supported upon said platform at an elevation thereabove, the front and rear wheels of said automobile being indicated respectively at C and C'. The supporting means comprises two frames, one of which is arranged at each side of the supported vehicle, each frame comprising two pairs of brace bars, the bars D and E of each pair jointly supporting one of the axle extremities of the vehicle. The brace members D form a V-shaped structure occupying a vertical plane parallel to the longitudinal axis of the vehicle B, and the two brace members E occupy another plane parallel to the longitudinal axis of the vehicle and inclined to the plane of the members D, intersecting said members D some distance below the upper extremities. In addition to their inclination transverse of the vehicle B adapting them to resist stresses acting laterally upon the vehicle, the members E are downwardly divergent so as to also oppose such stresses as act longitudinally of the vehicle. The lower ends of the members D are attached to a bracket F secured to the platform A substantially equidistant from the wheels C and C'. The lower ends of the members E are pointed as indicated at G, so that under the weight of the vehicle, said ends may embed themselves in the platform A.

The upper ends of each pair of members D and E are rigidly connected by a fitting H having the collar I for screw-threaded engagement by the member E and formed with the laterally-projecting tapering lug J for engagement by a sleeve K internally flared from its center portion to both ends, one of said sleeves being transversely mounted upon the upper end of each member D. Each sleeve K is clamped in engagement with the corresponding fitting H by a bolt L extending axially into said sleeve and tapped into the tapered lug J, and by a plate M engaged beneath the head of said bolt and bearing upon the outer end of said sleeve. The fitting H has a substantially flat top surface H' for engagement beneath the felly of one of the wheels C and C' and is slotted, as indicated at N opposite the lug J to embrace one of the spokes of said wheel. Said fitting is furthermore formed with upstanding lugs O at each side of the slot N to engage the inner edge of the wheel felly to hold the wheel upon the seat H'. Upon each of the members D and E there is mounted fast an arm P shaped to bear interiorly against the felly of the wheel. Thus, the felly of each wheel is engaged at three spaced points and a very positive restraint is applied to the wheels through the felly.

In that modification of the invention which is illustrated in Figures 3, 4 and 8, the wheels of the vehicle B are removed, and the invention provides for supporting the vehicle direct from the axle spindles. Two pairs of brace members D' and E' are arranged in a relation substantially the same as that of the members D and E forming part of the first described form of the invention. In this case, however, there is employed a fitting R to connect the upper extremities of each pair of members D' and E', said fitting being shown in detail in Figure 8. This member R is interiorly tapered as indicated at R' to receive the axle spindle R² and is externally tapered for engagement by a collar S, duplicating that designated as K in the first described form of the invention. The fitting R is formed with an integral collar T interiorly threaded for engagement by the upper end of the corresponding member E'. The bracket members P mounted upon the brace members of the first described form of the invention to engage the felly of the wheel are, of course, unnecessary when the vehicle is supported direct from its axle spindles. In both described forms of the invention the engagement of the brace members with the platform may be the same, the members D or D' in each case being attached to the bracket F, and the members E pointed to embed themselves in the platform and being engaged respectively with brackets F'.

Figures 12, 13, and 14 illustrate a modified form of fitting for engagement by the axle spindle and adapted to connect the upper ends of brace members E² and D², substantially duplicating the members E' and D' as regards their inclination and their attachment to the platform A of the car. This modified fitting comprises a sleeve U adapted to receive the axle spindle V and formed with a pair of opposed bosses W which are engaged by a yoke W' carried by the upper end of a brace member E² inclined correspondingly to the member E'. A second yoke X is carried by the upper end of a member D² inclined correspondingly to the member D', said yoke X engaging the ends of the sleeve U and embracing the yoke W. When this fitting is used, the brace members D² and E² occupy a common plane oblique to the longitudinal axis of the supported vehicle.

The transverse inclination of the members E resists lateral movement of the vehicle and the inclination of both members D and E to the vertical planes of the axles resists longitudinal movement. The members D, being in a vertical plane, are not appreciably affected by a transversely acting stress and are depended upon to offer a major resistance to stresses acting longitudinally. Because of the connection between the lower ends of the members D they can not be independently subjected to a lifting stress tending to pull the bracket F freely from the floor. The weight of the vehicle, however, will be a sufficient safe guard against the subjection of the brace members to any severe upwardly acting stresses.

When the described decking device is not in use it may be folded to very compact form. By sufficiently loosening the bolts L, the compactness may be increased by swinging the members D and E into parallelism.

What I claim as my invention is:

1. In a decking device for automobiles, a pair of supporting members associated with each axle extremity of a vehicle, the members of each pair being oppositely inclined to the vertical plane of the supported axle to resist longitudinally acting stresses, and one of the members of each pair being inclined transversely to the supported vehicle to resist laterally acting stresses.

2. In a decking device for automobiles, a plurality of supporting members associated with each axle extremity, two of said members respectively associated with corresponding axle extremities being downwardly convergent and connected at their lower extremities.

3. In a decking device for automobiles, a plurality of supporting members associated with each axle extremity, two of said members respectively associated with corresponding axle extremities being downwardly convergent, and a common means for securing said members to the supporting surface.

4. In a decking device for automobiles, a pair of downwardly divergent supporting members associated with each axle extremity of the supported vehicle, two of said members associated respectively with corresponding axle extremities of the vehicle being downwardly convergent, and a common means for securing said convergent members to the supporting surface.

5. In a decking device for automobiles, a pair of supporting members associated with each axle extremity, the members of each pair being oppositely inclined to the vertical plane of the supported axle to resist longitudinally acting stresses, corresponding members of each pair being in a substantially vertical plane longitudinally parallel to the supported vehicle, and the other two members of the supported pair being inclined transversely of said plane to resist laterally acting stresses.

6. In a decking device for automobiles, two downwardly divergent members respectively associated with the front and rear axles of the supported vehicle, said members being also inclined transversely relative to said vehicle, and two downwardly convergent supporting members respectively associated with said axles occupying a vertical plane longitudinally parallel to the vehicle.

7. In a decking device for automobiles, a pair of supporting members associated with each axle extremity of the supported vehicle, one of said members occupying a substantially vertical plane parallel to the vehicle, and the other member being inclined to said plane.

8. In a decking device for automobiles, a pair of supporting members associated with each axle extremity, one of said members being inclined in a vertical plane longitudinally parallel to the vehicle and the other occupying an inclined plane intersecting the plane of the first mentioned member intermediate the extremities of both members.

In testimony whereof I affix my signature.

ALFRED COPONY.